United States Patent
Hamada et al.

(10) Patent No.: US 6,980,322 B1
(45) Date of Patent: Dec. 27, 2005

(54) IMAGE FORMING APPARATUS IN WHICH LIGHT EMITTED BY AN EXPOSING LIGHT SOURCE IS CONDUCTED BY AN OPTICAL WAVEGUIDE

(75) Inventors: Takatoshi Hamada, Toyokawa (JP); Yoshikazu Watanabe, Toyohashi (JP); Masao Naito, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/536,376

(22) Filed: Mar. 28, 2000

(30) Foreign Application Priority Data

| Mar. 29, 1999 | (JP) | ................................ 11-086604 |
| Mar. 30, 1999 | (JP) | ................................ 11-089732 |

(51) Int. Cl.[7] ........................... G06F 3/12; G06F 13/00
(52) U.S. Cl. ....................................... 358/1.7; 399/26
(58) Field of Search ......................... 358/1.9, 1.13, 358/1.14, 1.15, 1.16, 1.7; 359/4, 5, 130, 137; 355/85; 399/26

(56) References Cited

U.S. PATENT DOCUMENTS

| 5,095,371 A | * | 3/1992 | Tanaka et al. .............. 358/300 |
| 5,521,999 A | | 5/1996 | Chuang et al. |
| 5,689,356 A | * | 11/1997 | Rainal ......................... 398/76 |
| 5,808,431 A | * | 9/1998 | Koyama et al. ............ 318/278 |
| 5,883,731 A | | 3/1999 | Kasai |

FOREIGN PATENT DOCUMENTS

| JP | 01-310369 | 12/1989 |
| JP | 04-240672 | 8/1992 |
| JP | 07-134224 | 5/1995 |
| JP | 9-277588 | 10/1997 |

OTHER PUBLICATIONS

Nonlinear Optics, Opt-Electronics Technology, Umegaki, Feb. 1, 1994 pp 3-10 (with English translation).

* cited by examiner

*Primary Examiner*—Douglas Tran
(74) *Attorney, Agent, or Firm*—Morrison & Foerster LLP

(57) ABSTRACT

An image forming apparatus includes a light source for emitting light constituting an optical signal, an optical waveguide for conducting the light emitted by the light source and an engine portion for receiving the light conducted by the optical waveguide. The engine portion includes a modulator for modulating the received light and a target on which an image corresponding to the optical signal is formed by being exposed by the modulated light.

19 Claims, 8 Drawing Sheets

IMAGE FORMING APPARATUS IN WHICH LIGHT EMITTED BY AN EXPOSING LIGHT SOURCE IS CONDUCTED BY AN OPTICAL WAVEGUIDE

This application claims priority to Japanese Patent Application Nos. H11(1999)-86604 filed on Mar. 29, 1999 and H11(1999)-89732 filed on Mar. 30, 1999, the disclosure of which is incorporated by reference in its entirety.

BACKGROUND OF THE INVENTION

1. Field of the Invention

The present invention relates to an image forming apparatus for forming an image by being exposed by light, and more particularly to, an image forming apparatus in which light emitted by an exposing light source is conducted by an optical waveguide.

2. Description of Related Art

In Japanese Unexamined Patent Laid-open Publication No. H9(1997)-277588, an image forming apparatus in which an optical signal is transmitted by an optical fiber is proposed.

This image forming apparatus is provided with an optical fiber for transmitting light emitted from an exposing light source such as a semiconductor laser. The image forming apparatus is further provided with a laser driver for driving the light source. The light emitted from the light source driven by the laser driver reaches a polygon mirror via the optical fiber.

An optical sensor is provided to control the light amount reaching the polygon mirror so as to be stabilized. The optical sensor monitors the light reflected by the polygon mirror to feed back to the laser driver. A light amount stabilizing controller (APC) in the laser driver 4 controls the light source so as to output a constant optical signal based on the feedback signal from the sensor.

However, the aforementioned image forming apparatus has the following drawbacks. Firstly, since the monitored result of the light output from the optical fiber is fed back to the driver of the light source, the light amount stabilizing control is complicated, causing an unstable control system. Secondly, since the light emitted by the light source is transmitted as it is to the photosensitive member for exposing it, the light having the most suitable wavelength is not always transmitted from the view points of a transmission efficiency by the optical fiber and the exposure to the photosensitive member.

SUMMARY OF THE INVENTION

It is an object of the present invention to solve the aforementioned drawbacks.

It is another object of the present invention to form a high quality and/or high resolution image by an image forming apparatus.

It is still another object of the present invention to increase stability of an exposing light amount stabilizing control system in an image forming apparatus.

It is still yet another object of the present invention to promote transmission efficiency of exposing light by an optical waveguide in an image forming apparatus.

It is still yet another object of the present invention to freely convert a wavelength of exposing light to be transmitted by an optical waveguide.

It is still yet another object of the present invention to promote transmission efficiency of exposing light by an optical waveguide in an image forming apparatus and to convert a wavelength of light into a different wavelength of light excellent in exposure sensitivity.

According to one aspect of the present invention, an image forming apparatus includes a light source for emitting light constituting an optical signal, an optical waveguide for conducting the light emitted by the light source, and an engine portion for receiving the light conducted by the optical waveguide. The engine portion includes a modulator for modulating the received light and a target on which an image corresponding to the optical signal is formed by being exposed by the modulated light.

In this image forming apparatus, the modulator in the engine portion modulates the received light and the modulated light is exposed on the target to form an image corresponding to the optical signal, enabling a light amount stabilizing control, which results in a high-quality and/or high-resolution image forming.

According to another aspect of the present invention, an image forming apparatus includes the aforementioned modulator for modulating the wavelength of the light at between the light source and the target.

With this image forming apparatus, the wavelength of the exposing light to be conducted by the optical waveguide can be converted.

According to still another aspect of the present invention, an image forming apparatus emits light suitable for being conducted by an optical waveguide, and modulates the wavelength of the light into a wavelength corresponding to an optical sensitivity of a target.

With this image forming apparatus, transmission efficiency for transmitting the exposing light by the optical waveguide can be increased. Furthermore, the light can be converted into a light having a wavelength excellent in exposure sensitivity.

According to still another aspect of the present invention, a printer includes a control portion for generating light constituting an optical signal corresponding to image information, an optical fiber for conducting the light generated by the control portion, and an engine portion. The engine portion includes a receiving portion for receiving the light conducted by the optical fiber, an adjusting portion for adjusting the intensity of the received light and an image forming portion for forming an image corresponding to the optical signal by the light adjusted its intensity, as a unit.

According to still another aspect of the present invention, a printer includes a control portion for generating light constituting an optical signal corresponding to image information, an optical fiber for conducting the light generated by the control portion, and an engine portion. The engine portion includes a receiver for receiving the light conducted by the optical fiber, a converter for converting the wavelength of the received light and an image forming portion for forming an image corresponding to the optical signal by the light adjusted its wavelength, as a unit.

According to still another aspect of the present invention, an image forming apparatus includes an image writing control portion which receives image information and converts the image information into image forming data, a laser driver for generating a controlling signal based on the image forming data, a laser for oscillating a laser beam constituting an optical signal corresponding to the image forming data based on the controlling signal, an optical fiber which conducts the light oscillated by the laser and outputs the light, a polygon mirror which has a polyhedron configuration and reflects the light conducted by the optical fiber, a photosensitive member for forming a latent image by being exposed by the light reflected by the rotating polygon mirror, an optical output sensor for receiving the light reflected by the polygon mirror to monitor the intensity of the light, and an optical output regulator for regulating the intensity of the light output from the optical fiber based on the intensity monitored by the optical output sensor. The optical output regulator includes a light amplifier for regulating a gain by the controlling light and a gain controller for setting the controlling light based on the intensity monitored by the optical output sensor.

Other objects and the features will be apparent from the following detailed description of the invention with reference to the attached drawings.

BRIEF DESCRIPTION OF THE INVENTION

The present invention will be more fully described and better understood from the following description, taken with the appended drawings, in which.

DETAILED DESCRIPTION OF THE PREFERRED EMBODIMENTS

Figure 1:
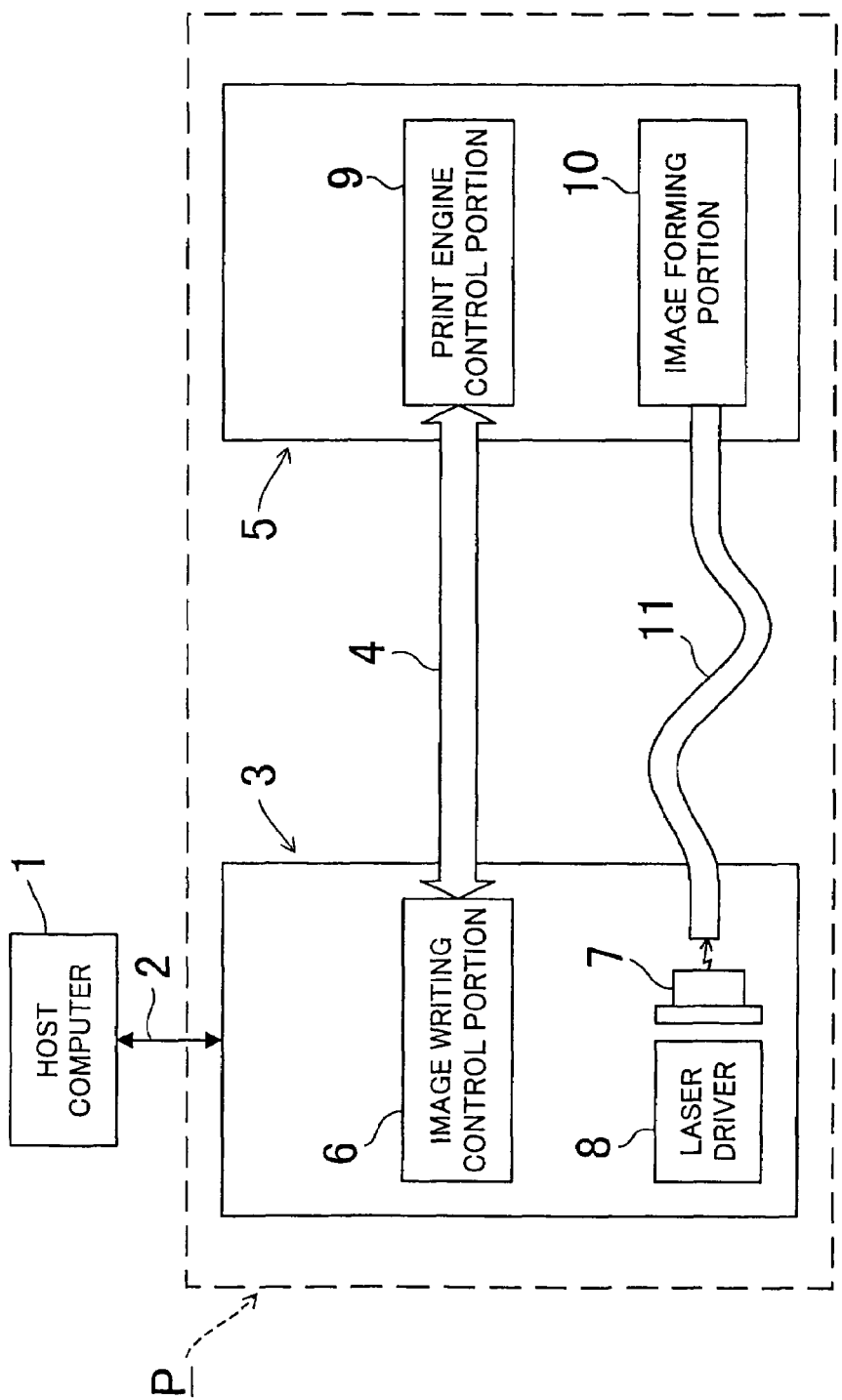
FIG. 1 is a block diagram showing an image forming apparatus according to an embodiment of the present invention.

FIG. 1 is a block diagram showing a laser beam printer according to one embodiment of the present invention.

As shown in FIG. 1, the laser beam printer P is provided with a video controller 3 connected to a host computer 1 as a higher-ranking apparatus by way of a host interface 2 and a print engine portion 5 connected to the video controller 3 by way of a video interface 4 for executing an electrophotographing process.

The video controller 3 receives image information transmitted from the host computer 1 to convert the received image information into bit map data, i.e., image forming data for actually recording the image information to an image transfer paper. The video controller 3 is provided with an image writing control portion 6, a semiconductor laser (such as a laser diode) 7 and a laser driver 8 for driving the semiconductor laser 7.

The aforementioned image information to be transmitted from the host computer 1 includes not only a printing data but also codes for performing a format control and/or a print mode setting.

Figure 2:
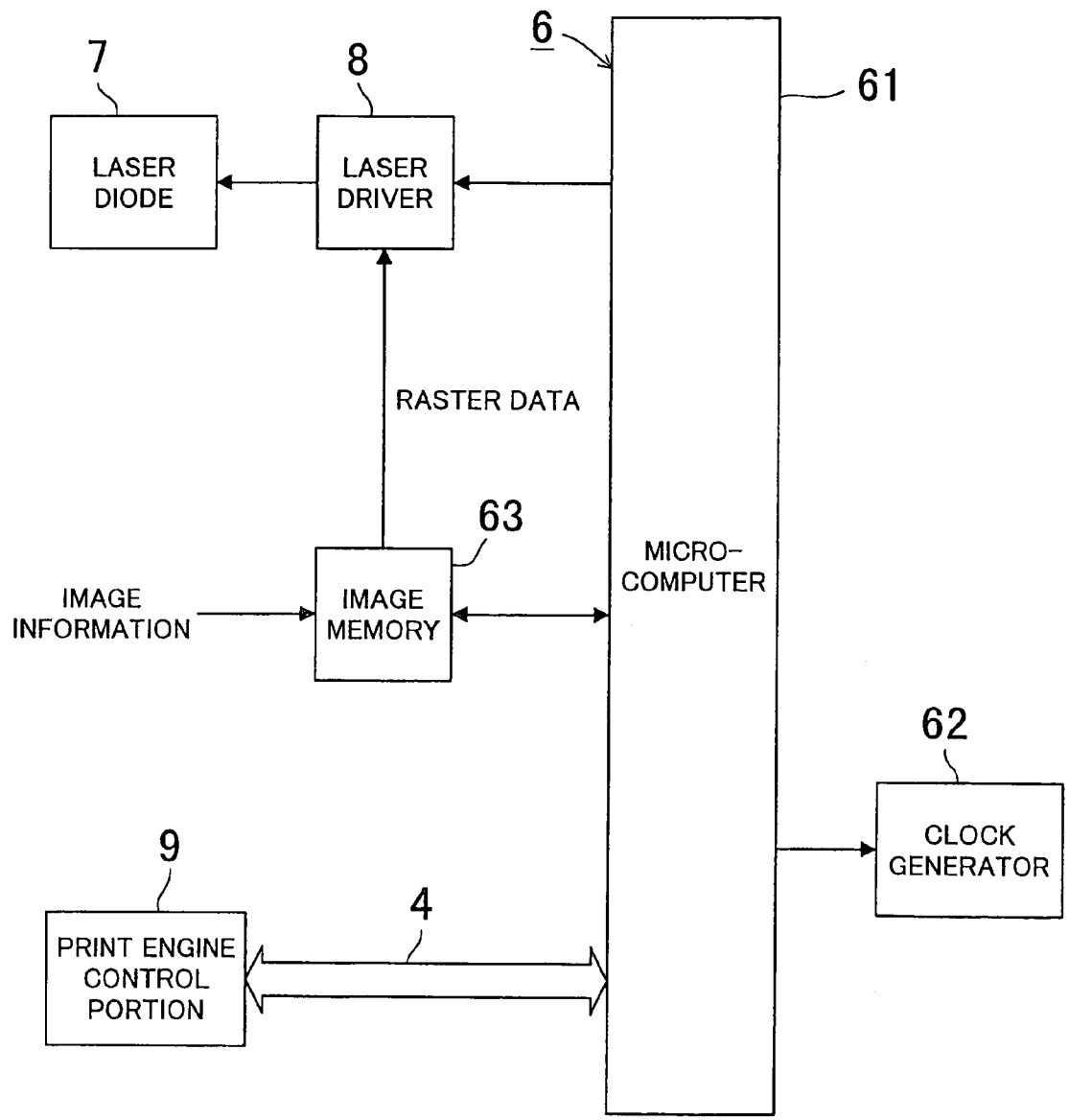
FIG. 2 is a schematic structural view showing an image writing control portion in the video controller.

As shown in FIG. 2, for example, the image writing control portion 6 includes a microcomputer 61, a clock generator 62 for driving the microcomputer 61 and an image memory 63 for storing the image information. The image writing control portion 6 converts printing data such as characters transmitted as ASCCII-code into raster-data which are dotted on-off information per every one line. The image writing control portion 6 drives the laser driver 8 in accordance with the raster-data every one line in synchronism with the SOS signal (start of scan signal) sent from the print engine portion 5. The image writing control portion 6 decodes the print mode data or print format data other than printing data and transmits a control signal to the print engine portion 5 by way of the interface 4 to execute the printing or the formatting. As understood from the above explanation, the image writing control portion 6 receives/transmits various data and/or signals between the video controller 3 and the print engine portion 5. The signals include an emission permit signal transmitted from the print engine portion 5 for allowing the semiconductor laser 7 to emit laser beam.

In this embodiment, a laser diode is used as the semiconductor laser 7, however, it is not limited to the semiconductor laser. Furthermore, the optical source is not limited to a semiconductor laser.

Figure 4:
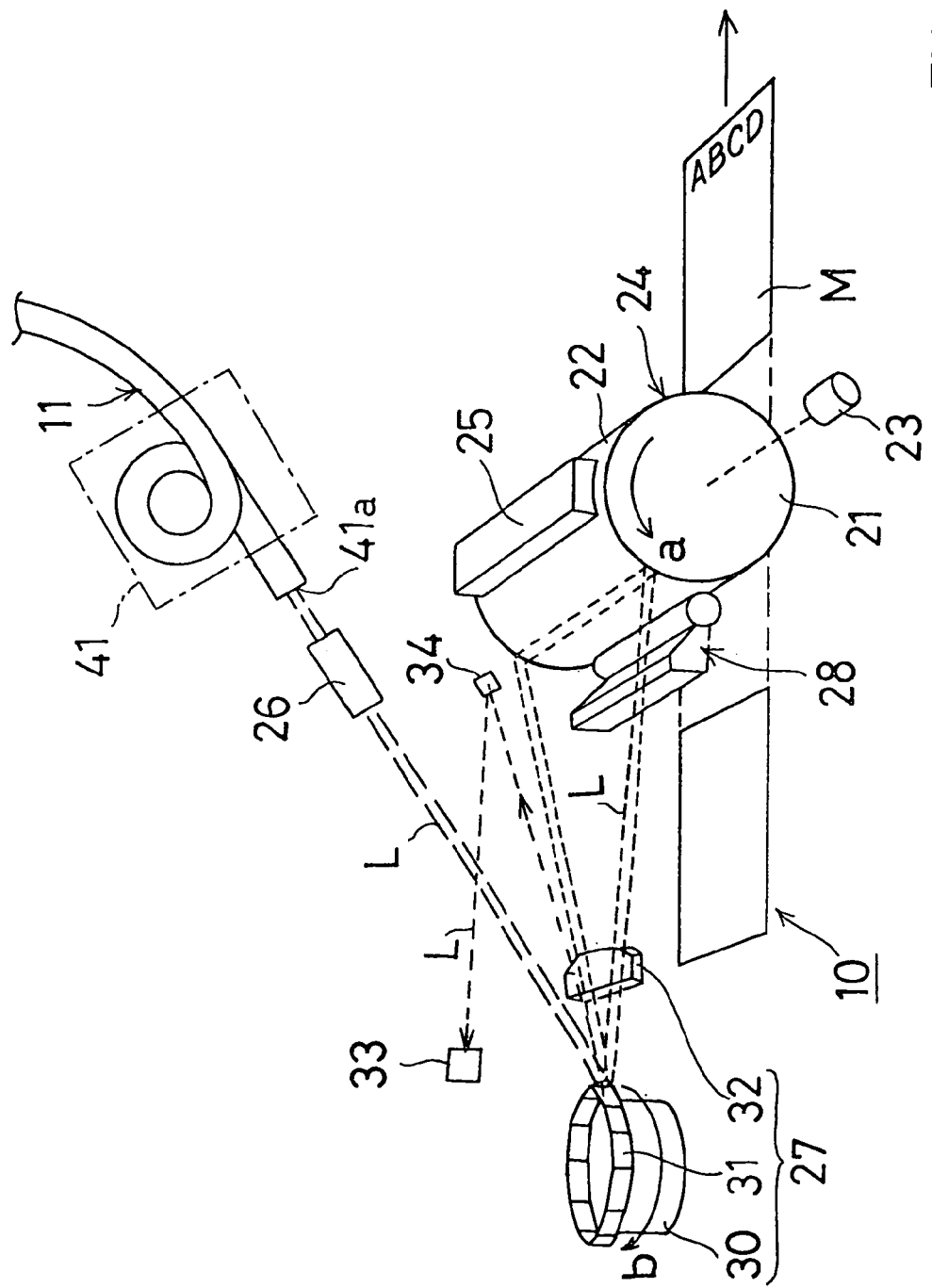
FIG. 4 is a perspective view showing an image forming portion in the image forming apparatus

The print engine portion 5 executes an electrophotography process based on the information transmitted from the video controller 3 to record an image on an image transfer paper M (see, FIG. 4). The print engine portion 5 is provided with a print engine control portion 9 which gives and receives signals between the image writing control portion 6 and the print engine control portion 9 and an image forming portion 10 which scans a photosensitive member 22 by an optical signal sent from the semiconductor laser 7 to form a latent image on the photosensitive member 22 which will be mentioned later, and to form an image by executing a developing process, an image transferring process and a fixing process. Furthermore, the semiconductor laser 7 and the image forming portion 10 are optically connected by an optical fiber 11.

Figure 3:
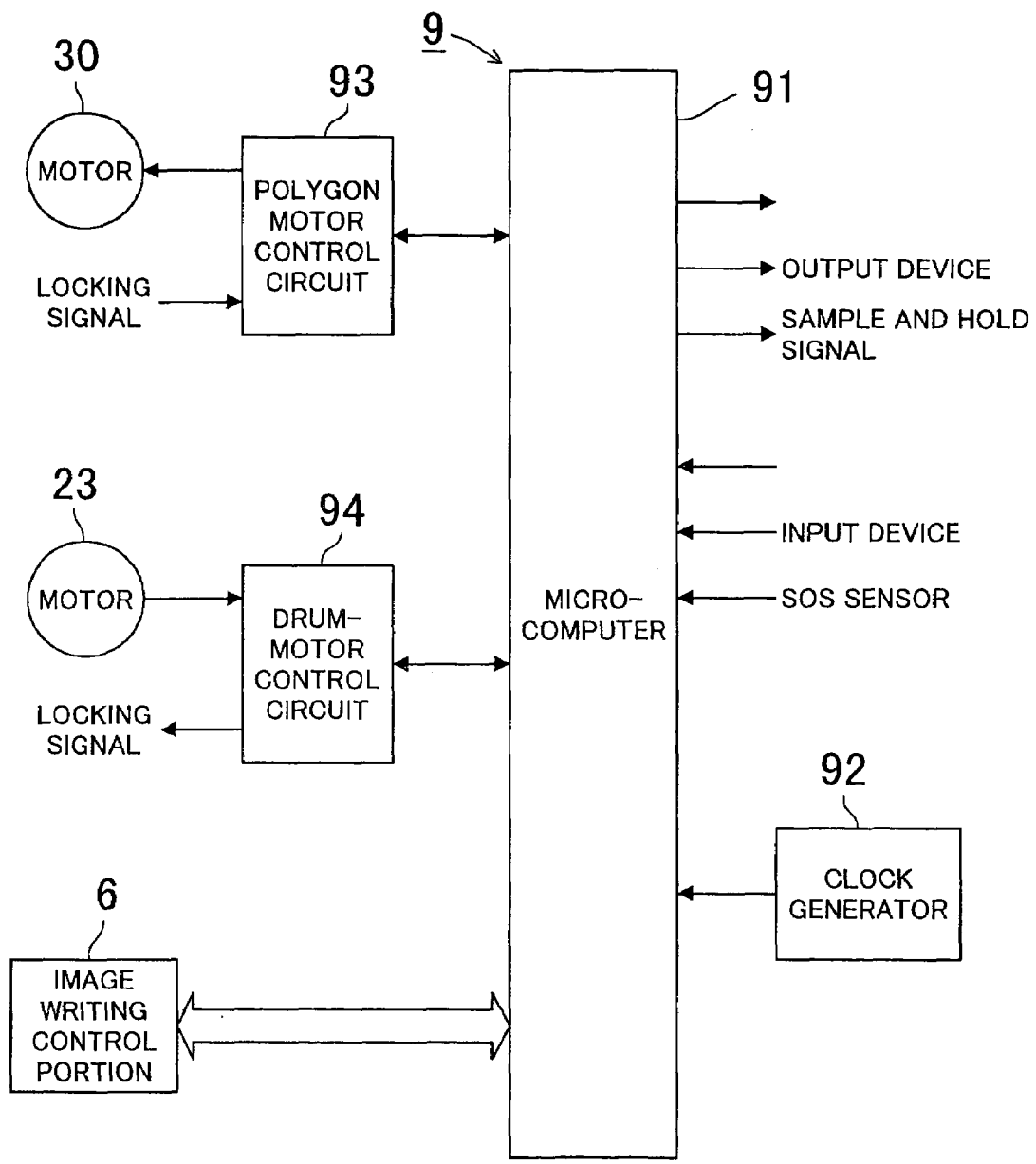
FIG. 3 is a schematic structural view showing a print engine control portion in a print engine portion.

As shown in FIG. 3, for example, the aforementioned print engine portion 9 is provided with a microcomputer 91 and a clock generator 92 for driving the microcomputer 91. When a print execute command is issued after the completion of the image information analysis by the video controller 3, the print engine control portion 9 confirms that the print engine portion 5 is in a standby state. Thereafter, the print engine control portion 9 transmits a light emission permit signal for the semiconductor laser 7 to the video controller 3. Thus, the electrophotography process starts.

Concretely, the microcomputer 91 drives a polygon motor 30 and a photosensitive drum motor 23 by way of a polygon motor control circuit 93 and a drum motor control circuit 94, respectively. When each motor 30, 23 reaches a predetermined rotational velocity, a locking signal is input to keep the rotational velocity unchanged.

In order to prevent a partial deterioration of the photosensitive member 22 on a photosensitive drum 24, the emission permit signal for the semiconductor laser 7 will not be transmitted to the image writing control portion 6 unless the locking signal is activated.

The microcomputer 91 is connected by a device (not shown) necessary for driving the laser printer P, input/output devices (not shown) for a sensor. The microcomputer 91 receives a signal from an SOS sensor 33 and transmits a sample and hold signal for controlling a gain of an optical amplifier.

As shown in FIG. 4, the image forming portion 10 includes a photosensitive drum 24, an electrostatic charger 25, an optical output regulator 41 as one of modulators, an optical scanning portion 27 as an latent image forming portion and a developing device 28. The photosensitive drum 24 comprises a rotating drum 21 and a photosensitive layer (photosensitive member) 22 coated on the outer peripheral surface of the drum 21, and is rotatably driven by a motor 23, for example, in the direction of the arrow (a) shown in FIG. 4. The optical output regulator 41 is provided at an output end portion of the optical fiber 11. The optical scanning portion 27 optically scans the photosensitive layer 22 in a horizontal direction thereof (i.e., in the axial direction of the photosensitive drum 24) by an optical signal L emitted from the output end 41a of the optical output regulator 41 by way of a condenser 26 to form a latent image on the photosensitive layer 22. The developing device 28 changes the electrical latent image formed on the photosensitive layer 22 by being exposed by the optical signal L into a visual image by toner.

The optical scanning portion 27 includes a polygon mirror 31 and an f-θ lens 32 positioned in front of the polygon mirror 31, etc. The polygon mirror 31 is rotatably driven at a constant high rotational velocity, for example, in the direction of the arrow (b) by a motor 30, and reflects the optical signal output from the optical output regulator 41 to scan the photosensitive layer 22. A part of the reflected lay from the polygon mirror 31 advances to an SOS mirror 34, and is reflected by the SOS mirror 34 to be introduced to an SOS sensor 33. The SOS sensor 33 functions as a horizontal synchronizing signal detecting sensor for the start of horizontal scanning of the photosensitive layer. The light input to the SOS sensor 33 is photoelectrically converted into an electrical signal which in turn is input into the microcomputer 91 of the print engine control portion 9. Based on this, the aforementioned SOS signal as a scan start signal is output every one line from the print engine control portion 9 to the image writing control portion 6.

The optical output regulator 41 regulates the output level of the optical signal transmitted through the optical fiber 11 without changing the light itself. In this embodiment, a light amplifier is used as the optical output regulator 41. The concrete structure is shown in FIG. 5.

Figure 5:
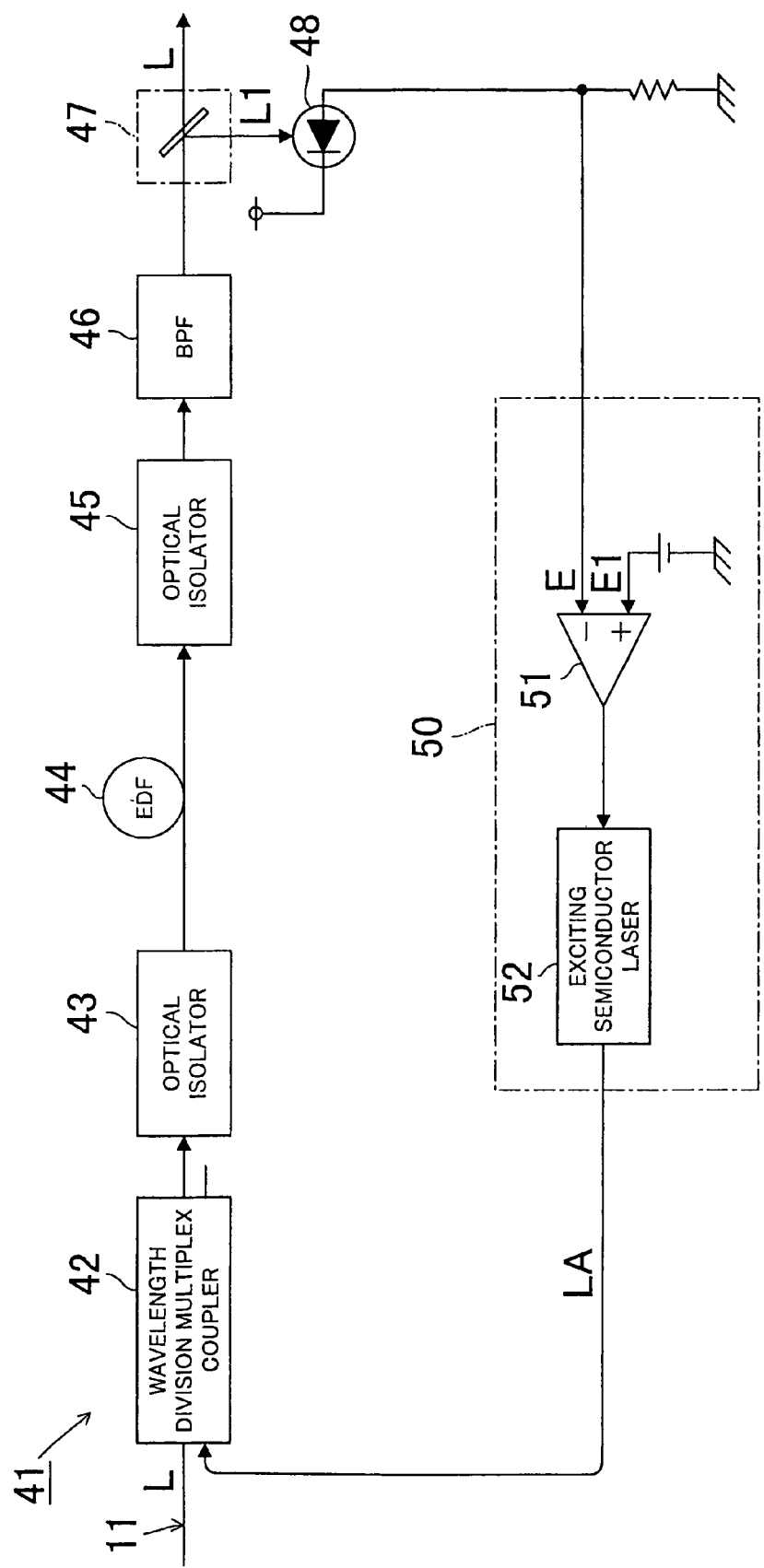
FIG. 5 is a block diagram showing a construction of an optical output regulator.

In FIG. 5, this optical output regulator 41 includes an erbium added optical fiber (hereinafter referred to as "EDF") amplifier 44 as a main component to constitute an automatic power control system (hereinafter referred to as "APC") in which an output is fed back in a real time via a gain control portion 50. The EDF amplifier 44 controls the gain so as to keep the output of the optical signal L constant by adding exciting light as controlling light.

The reference numeral 42 denotes a wavelength division multiplex coupler for coupling the optical signal L transmitted by the optical fiber 11 and exciting light LA which will be mentioned later. Connected to the coupler 42 are a first optical isolator 43, the EDF amplifier 44, a second optical isolator 45, a bandpass filter (hereinafter referred to as "BPF") 46 for passing only the signal light L and a light-branch coupler 47 for branching a part L1 of the signal light L in this order.

The reference numeral 48 denotes a photodiode as a photoelectric converting element for receiving the branched light L1 from the light-branch coupler 47. The reference numeral 50 denotes a gain control portion which outputs the controlling light LA for keeping the output of the EDF amplifier 44 constant depending on the value of the output signal from the photodiode 48. The gain control portion 50 includes a differential amplifier 51 for comparing the output signal value from the photodiode 48 with a reference value to output the differential and an exciting semiconductor laser 52 using the output of the differential amplifier 51 as injection electric current. The exciting semiconductor laser 52 outputs the exciting light LA as a controlling light corresponding to the comparison output of the differential amplifier 51 to the EDF amplifier 44 by way of the wavelength division multiplex coupler 42.

In other words, the optical signal L transmitted from the video controller 3 by the optical fiber 11 is input into the wavelength division multiplex coupler 42 to be coupled with the exciting light LA from the exciting semiconductor laser 52 by the wavelength division multiplex coupler 42, and then input into the EDF amplifier 44 by way of the first optical isolator 43. The EDF amplifier 44 adjusts its gain against the optical signal L depending on the amount of the exciting light LA. The output of the EDF amplifier 44 is input into the BPF 46 via the second optical isolator 45. The BPF 46 only passes the optical signal L to delete unnecessary natural light. The first and second optical isolators 43, 45 restrains unnecessary reflected light to obtain a stable gain.

A part L1 of the optical signal L passed the BPF 46 is converted into an electric signal by the photodiode 48. The output value E of the electric signal is input into the differential amplifier 51 to be compared with the reference value. The differential thereof becomes injection electric current of the exciting semiconductor laser 52.

If the output value E is larger than the reference value E1, the injection current decreases, resulting in a decreased output value of the exciting light LA from the exciting semiconductor laser 52, which in turn decreases a gain against the optical signal L. On the other hand, if the output value E is smaller than the reference value E1, the injection current increases, resulting in an increased output value of the exciting light LA from the exciting semiconductor laser 50, which in turn increases a gain against the optical signal L. As a result, the gain against the optical signal L in the EDF amplifier 44 is automatically adjusted to be constant.

Therefore, even if the characteristic of the semiconductor laser 7 or the optical fiber 11 is uneven when manufactured, or 104 even if the output of the optical signal decreases due to the deterioration of the semiconductor laser 7 or the optical fiber 11 as time passes, the optical output regulator 41 enables a constant output of the optical signal L appropriate for exposing the photosensitive layer 22 at the print engine portion 5.

Next, the operation of the aforementioned laser beam printer P will be explained.

When the video controller 3 receives image information from the host computer 1, the image writing control portion 6 develops the image information into raster data every one line and sends a print execution command to the print engine control portion 5.

The print engine control portion 9 of the print engine portion 5 confirms that the print engine portion 5 is in a standby state based on the print execution command transmitted from the video controller 3, and transmits an emission permit 25 signal for the semiconductor laser 7 to the video controller 3 to start the execution of the electrophotography process.

The video controller 3 starts to operate the laser driver 8 in the video controller 3 based on the raster data when received the emission permit signal for the semiconductor laser 7. Then, the laser driver 8 operates the semiconductor laser 7.

The semiconductor laser 7 is turned on/off depending on the raster data to output an optical signal L as a laser beam. The optical signal L from the semiconductor laser 7 is transmitted to the image forming portion 10 by way of the optical fiber 11. As mentioned above, since the semiconductor laser 7 and the laser driver 8 are disposed in the video controller 3, and the optical signal L emitted from the semiconductor laser 7 is transmitted to the image forming portion 10 via the optical fiber 11, the transfer loss can be decreased as compared to the case where the semiconductor laser 7 and the laser driver 8 are disposed in the print engine portion 5 and the video signal is transmitted to the laser driver 8 by an electric cable. Furthermore, a high frequency optical signal can be effectively transferred, and emitting noises or receiving external noises can be restrained regardless of the length between the video controller 3 and the image forming portion 10.

The optical signal L transmitted by the optical fiber 11 is adjusted its output level by the optical output regulator 41 at the print engine portion 5. Thereafter, the adjusted optical signal L is output from the output end 41*a* of the optical output regulator 41. A part of the optical signal L is branched by the light-branch couple 47 into a branched light L1 to be photoelectrically converted into an electric signal E. The converted electric signal E is input into a gain control portion 50.

In the gain control portion 50, the electric signal E is compared with the reference value E1. In accordance with the differential, the exciting light LA to be output from the exciting semiconductor laser 52 increases or decreases.

The exciting light LA and the optical signal L transmitted by the optical fiber 11 are coupled by the wavelength division multiplex coupler 42, and the optical signal L is amplified at a certain gain by the EDF amplifier 44. Only the optical signal of the output of the EDF amplifier 44 is allowed to pass through the BPF 46 to be output from the output end 41*b* of the optical fiber 11.

As explained above, since the output signal level of the EDF amplifier 44 is compared with the reference value and a feedback control for controlling the gain of the EDF amplifier 44 is performed depending on the result of the comparison, the output level of the optical signal L output from the optical output regulator 41 is automatically adjusted to have a constant value corresponding to the reference value E1.

The optical signal L output from the optical output regulator 41 passes through the lens (condenser) 26, and is then reflected by the polygon mirror 31 toward the photosensitive drum 24. Since the polygon mirror 31 is rotating at a constant velocity, the optical signal L horizontally scans the electrostatically charged photosensitive layer 22 of the photosensitive drum 24.

The aforementioned operation is performed every one line based on the SOS signal from the print engine portion 5, forming a latent image on the photosensitive layer 22 corresponding to the printing data.

After the formation of the latent image on the photosensitive layer 22, a developing process, a transferring process to an image transfer paper M, a fixing process and the like are performed. As a result, a printing data is recorded on the image transfer paper M.

Figure 6:
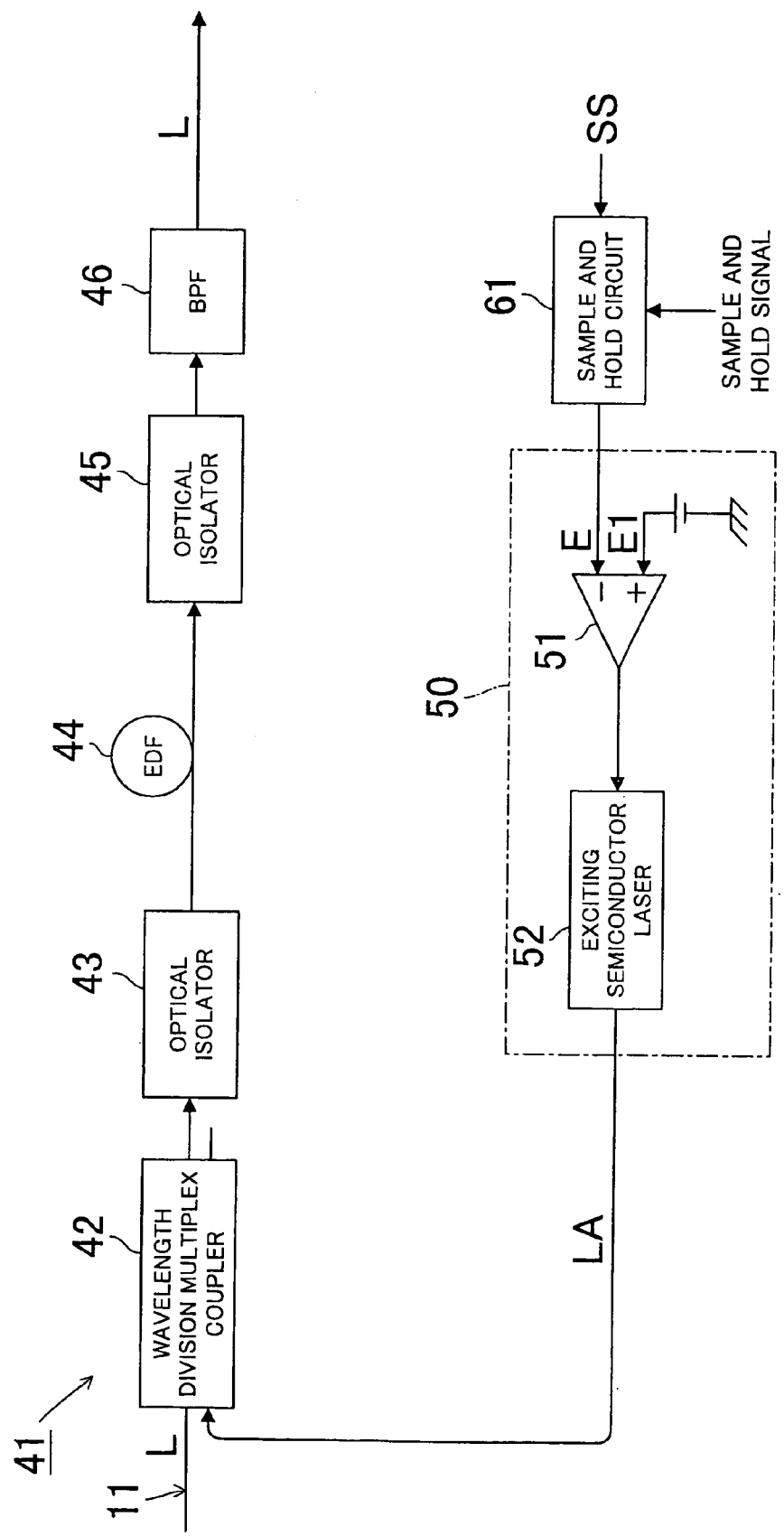
FIG. 6 is a block diagram showing another construction of optical output regulator.

FIG. 6 shows another embodiment of the optical output regulator 41. The detail explanation will be omitted by allotting the same reference numeral to the same or a corresponding portion in FIG. 5.

In the embodiment shown in FIG. 6, a signal from the SOS sensor 33 is input instead of inputting the signal which is a branched part L1 of the optical signal L and photoelectrically converted by the photodiode 48. Since this SOS sensor 33 also photoelectrically converts a part of the optical signal L as mentioned above, it can be used as a device equivalent to the photodiode 48.

Concretely, the SOS signal SS is input into the differential amplifier 51 via the sample and hold circuit 61. Every time the optical signal L is input into the SOS sensor 33, a sample and hold signal for holding the SOS signal to be input into the differential amplifier 51 at the sample and hold circuit 61 is output from the microcomputer 91 of the print engine control portion 9. Based on the sample and hold signal, the held signal E is comparted with the reference voltage E1, the injection current to the exciting semiconductor laser 52 becomes constant within one line, and a gain control against the optical amplifier 44 is performed. This is an APC type in which a feedback is performed every one line.

In the optical output regulator shown in FIG. 6, since the existing SOS sensor 33 can be used as a photoelectric converting element, it is not required to branch a part L1 of the optical signal L or to newly provide photoelectric converting portion for converting the part L1 of the optical signal L, resulting in a simple structure.

Next, an image forming apparatus according to another embodiment of the present invention will be explained.

Figure 7:
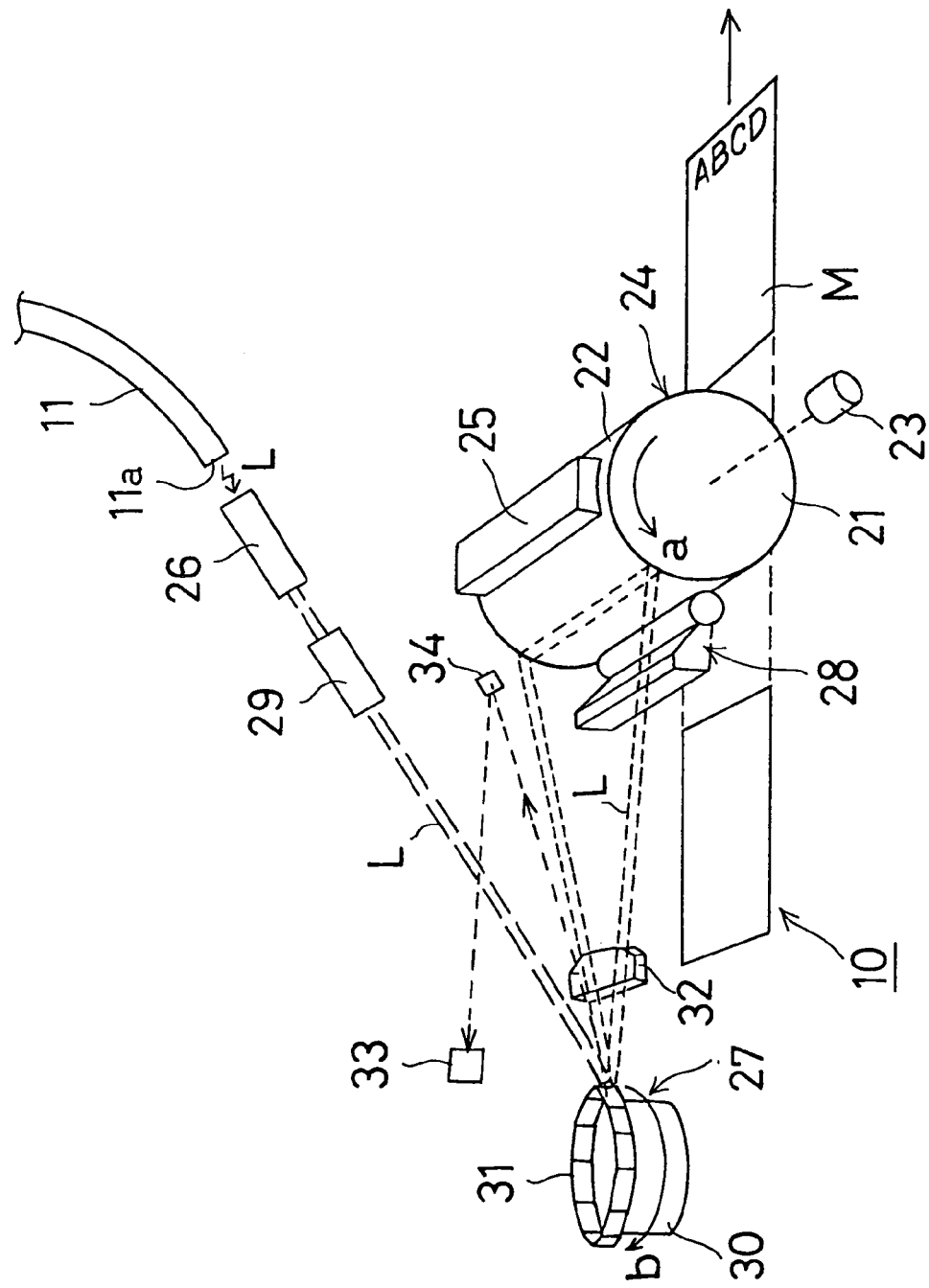
FIG. 7 is a schematic view showing an image forming portion in an image forming apparatus according to another embodiment of the present invention.

FIG. 7 shows an image forming portion 10 of an image forming apparatus according to the embodiment. The image forming apparatus according to the embodiment has the same elements as in the image forming apparatus P shown in FIGS. 1–6, except that the optical output regulator 41 is not provided to the optical fiber 11; the light output from the end portion 11*a* of the optical fiber 11 and passed through the lens 26 is input to the polygon mirror 31 via an optical wavelength converter 29 as one of modulators. Therefore, the same portions as in the image forming apparatus shown in FIGS. 1–6 are allotted by the same reference numerals as in FIGS. 1–6, and the explanation will be omitted.

In the image forming apparatus shown in FIG. 7, the light output from the output end 11*a* of the optical fiber 11 passes the lens 26 and the optical wavelength converter 29 disposed in front of the lens on the optical path in order.

The optical wavelength converter 29 converts the wavelength of the optical signal transmitted by the optical fiber 11 into a different wavelength appropriate for exposing the photosensitive layer 22. In other words, the wavelength excellent for transmitting an optical signal by an optical fiber 11, or small in transfer loss is different from the wavelength appropriate for exposing the photosensitive layer 22. Therefore, the wavelength of the optical signal transmitted from the optical fiber 11 is converted into a wavelength coincide with the sensitivity of the photosensitive layer 22 by the optical wavelength converter 29.

Figure 8:
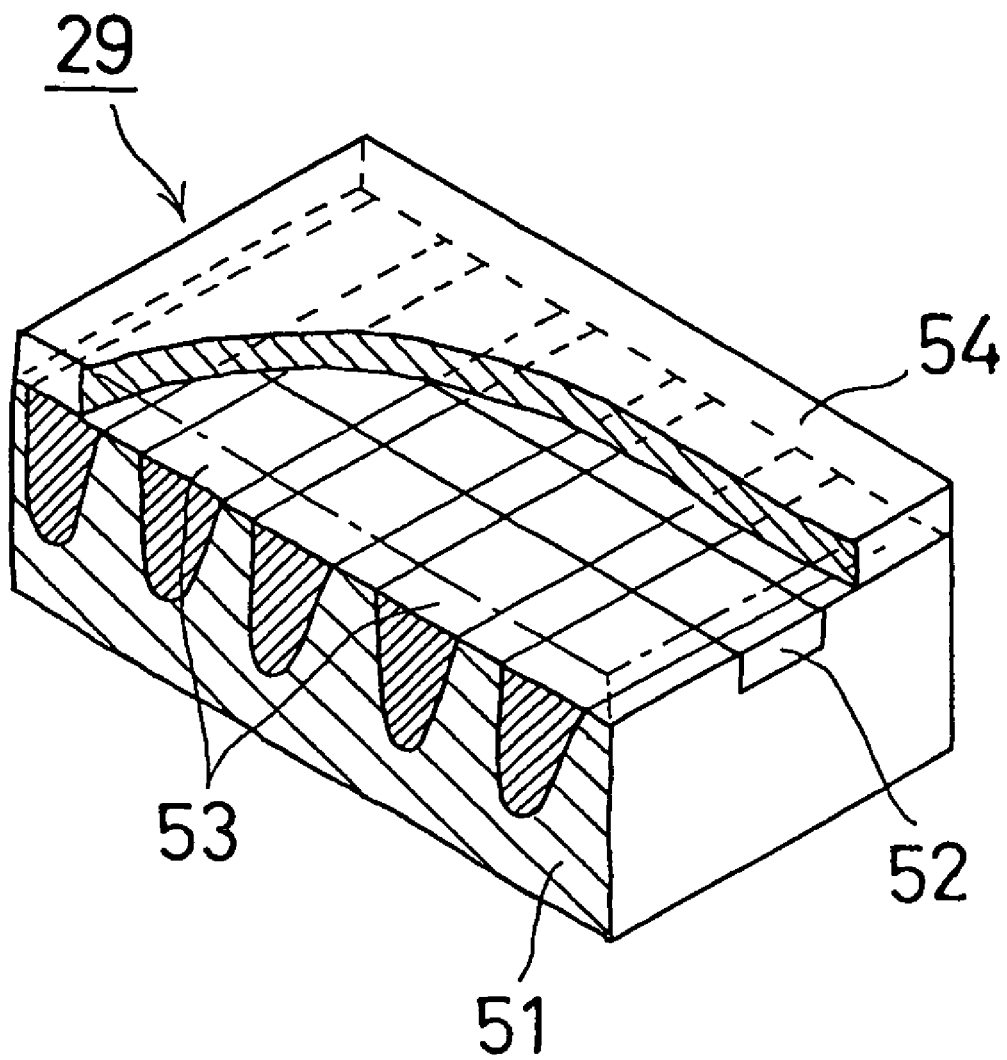
FIG. 8 is a perspective schematic view showing a wavelength converter.

As the aforementioned optical wavelength converter 29, a publicly known structure utilizing, for example, an optical second-harmonic generator may be employed. In this embodiment, an optical waveguide element shown in FIG. 8 is used. The element has a substrate 51 having a main surface and made of MgO with LiNbO$_3$ added thereto. Formed on the main surface are an optical waveguide 52 extending along the optical path of the optical signal L, a plurality of reversed polarization regions 53 crossing the optical waveguide 52 and a film 54 having high refractive index coated on the main surface. The optical signal emitted from the output end 11*a* of the optical fiber 11 and introduced into the optical waveguide 52 is partially converted into an optical second-harmonic component due to the nonlinear characteristic of the substrate 51 of the optical waveguide. Furthermore, the reversed polarization region 53 plays a role in adjusting the phase of the optical second-harmonic component. Therefore, the generated second-harmonic components are added to be output as a strong optical signal. As is apparent from the above, new coherent light is generated as a function of the nonlinear polarization by the optical waveguide element, and the wavelength conversion is performed.

In this embodiment, the wavelength λ of the optical signal generated by the semiconductor laser 7 and transmitted by the optical fiber 11 is set to 1.55 µm which is small in transfer loss against the optical fiber 11. The wavelength is converted into a wavelength λ2=775 nm, which is a second-harmonic component and is excellent in exposure sensitivity to the photosensitive layer 22, by the optical wavelength converter 29.

Since the wavelength of the light generated by the semiconductor laser 7 is set to 1.55 µm which is small in transfer loss against the optical fiber 11, the loss of the optical signal which is being transmitted by the optical fiber 11 decreases, resulting in a high efficient transmitting of the optical signal.

After the optical signal L transmitted by the optical fiber 11 is output from the output end 11a of the optical fiber 11, the optical signal L is input into the optical wavelength converter 29 through the lens 26. The wavelength small in transfer loss of the optical fiber 11 is converted into a wavelength of 775 nm excellent for exposing the photosensitive layer 22 by the optical wavelength converter 29. Thereafter, the optical signal is reflected by the polygon mirror 31 toward the photosensitive drum 24. Since the polygon mirror rotates at a constant velocity, the optical signal L horizontally scans the electrostatically charged photosensitive layer 22 of the photosensitive drum 24.

This operation is repeated every one line based on the SOS signal from the print engine portion 5, forming a latent image corresponding to the printing data on the photosensitive layer 22.

Since the exposure of the photosensitive layer 22 is performed by the optical signal having a wavelength appropriate to the sensitivity of the photosensitive layer 22, high resolution latent image or high resolution visual image can be recorded.

After the formation of the latent image on the photosensitive layer 22, printing data are recorded on an image transfer paper M through exposing process, transferring process to an image transfer paper M and fixing process.

In the embodiment shown in FIGS. 7 and 8, an optical waveguide element is used as the optical waveguide converter 29. However, the optical waveguide converter 29 may be constituted by any element other than an optical waveguide element. Furthermore, the wavelength of the light before and after the wavelength conversion by the optical wavelength converter 29 is not limited to 1.55 µm and 775 nm. The wavelength may be changed in accordance with the characteristic of the optical fiber 11 or the photosensitive layer 22 to be used.

The optical wavelength converter 29 is provided between the output of the optical fiber 11 and the photosensitive layer 22, and the wavelength of the optical signal output from the optical fiber 11 is converted so as to expose the photosensitive layer 22. However, the optical wavelength converter 29 may be disposed between the semiconductor laser 7 and the optical fiber 11. In short, the optical wavelength converter 29 can be disposed in the optical path of the optical signal between the exposure light source 7 and the photosensitive layer 22. Furthermore, the number of the optical wavelength converter 29 is not limited to one, but may be two or more.

In the aforementioned embodiments, the image forming apparatus is explained as a laser printer P. However, the present invention may be applied to any other image forming apparatus such as electrostatic copying machine, etc.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. An image forming apparatus, comprising:
   a light source for emitting light constituting an optical signal;
   an optical waveguide for conducting the light emitted by said light source; and
   an engine portion for receiving the light conducted by said optical waveguide,
   wherein said engine portion comprises a modulator for modulating the received light and a target on which an image corresponding to the optical signal is formed by being exposed by the modulated light.

2. The image forming apparatus as recited in claim 1, wherein said optical waveguide consists of one line.

3. The image forming apparatus as recited in claim 1, wherein said modulator changes an intensity of the received light.

4. The image forming apparatus as recited in claim 3, wherein said modulator comprises a light amplifier for adjusting a gain using a controlling light, a photoelectric conversion portion which photoelectrically converts a portion of the light passed through said light amplifier to output the photoelectrically converted light, and a gain control portion for generating the controlling light depending on an output of said photoelectric conversion portion.

5. The image forming apparatus as recited in claim 4, further comprising a polygonal mirror for reflecting the modulated light, wherein an image is formed on said target by the modulated light.

6. The image forming apparatus as recited in claim 5, wherein the photoelectric conversion portion photoelectrically converts a portion of the light reflected by the polygonal mirror.

7. The image forming apparatus as recited in claim 1, wherein said modulator converts a wavelength of the light.

8. The image forming apparatus as recited in claim 1, wherein said modulator modulates the light between said light source and said target.

9. The image forming apparatus as recited in claim 8, wherein said modulator converts a wavelength of the light.

10. The image forming apparatus as recited in claim 9, wherein said modulator converts the wavelength of the light between said light source and said optical waveguide.

11. The image forming apparatus as recited in claim 8, wherein said modulator modulates the light between said optical waveguide and said target.

12. The image forming apparatus as recited in claim 11, wherein said modulator converts a wavelength of the light into a wavelength corresponding to an optical sensitivity of said target.

13. The image forming apparatus as recited in claim 12, wherein the wavelength generated by said light source is suitable for being conducted by said optical waveguide.

14. A printer, comprising:
   a control portion for generating light constituting an optical signal corresponding to image information;
   an optical fiber for conducting the light generated by said control portion; and
   an engine portion comprising a receiving portion for receiving the light conducted by said optical fiber, an adjusting portion for adjusting the intensity of the received light, and an image forming portion for forming an image corresponding to the optical signal according to the intensity adjusted light.

15. A printer, comprising:
   a control portion for generating light constituting an optical signal corresponding to image information;
   an optical fiber for conducting the light generated by said control portion; and
   an engine portion comprising a receiving portion for receiving the light conducted by said optical fiber, a converter for converting the wavelength of the received light, and an image forming portion for forming an image corresponding to the optical signal according to the wavelength adjusted light.

16. An image forming apparatus, comprising:
   an image writing control portion which receives image information and converts the image information into an image forming data;
   a laser driver for generating a controlling signal based on the image forming data;
   a laser for oscillating a laser beam constituting an optical signal corresponding to the image forming data based on the controlling signal;
   an optical fiber which conducts the light oscillated by said laser and outputs the light;
   a polygonal mirror which has a polyhedron configuration and reflects the light conducted by said optical fiber;
   a photosensitive member for forming a latent image by being exposed by the light reflected by said rotating polygonal mirror;
   an optical output sensor for monitoring the intensity of the light reflected by said polygonal mirror; and
   an optical output regulator for regulating the intensity of the light output from said optical fiber based on the intensity monitored by said optical output sensor.

17. An image forming apparatus as recited in claim 16, wherein said optical output adjustor comprises a light amplifier for adjusting a gain using a controlling light and a gain control portion for setting the controlling light based on the intensity monitored by said optical output sensor.

18. An image forming apparatus, comprising:
   an image writing control portion which receives image information and converts the image information into image forming data;
   a laser driver for generating a controlling signal based on the image forming data;
   a laser for oscillating a laser beam constituting an optical signal corresponding to the image forming data based on the controlling signal;
   an optical fiber which conducts the light oscillated by said laser and outputs the light;
   a photosensitive member for forming a latent image by being exposed by the light conducted by said optical fiber; and
   a wavelength converter for converting the wavelength of the light output from said optical fiber.

19. An image forming apparatus, comprising:
   a light source for emitting light constituting an optical signal;
   an image holder on which an image corresponding to the optical signal is formed;
   an optical waveguide for conducting the emitted light on said image holder; and
   a modulator for modulating the light conducted by said optical waveguide,
   wherein the emitted light is modulated while constituting the optical signal.

* * * * *